United States Patent [19]

McBride et al.

[11] Patent Number: 5,236,754
[45] Date of Patent: Aug. 17, 1993

[54] REORIENTED INSULATION ASSEMBLY AND METHOD

[75] Inventors: Merle F. McBride, Heath; Russell L. Ault, Newark, both of Ohio

[73] Assignee: Owens-Corning Fiberglas Technology, Inc., Summit, Ill.

[21] Appl. No.: 764,592

[22] Filed: Sep. 24, 1991

Related U.S. Application Data

[63] Continuation-in-part of Ser. No. 447,764, Dec. 8, 1989, abandoned.

[51] Int. Cl.⁵ .......................... B32B 3/10; B32B 1/06
[52] U.S. Cl. .................................... 428/55; 428/58; 428/74; 428/76; 428/138; 428/220; 428/192
[58] Field of Search ................ 428/74, 76, 55, 192, 428/220, 58, 138; 156/71

[56] References Cited

U.S. PATENT DOCUMENTS 2,160,001  5/1939  Saborsky ........................... 428/74
2,782,465  2/1957  Palmer .............................. 428/74

Primary Examiner—Alexander S. Thomas
Attorney, Agent, or Firm—Ted C. Gillespie

[57] ABSTRACT

A reoriented insulation assembly and the method of making same is disclosed. The insulation assembly includes a plurality of mineral fiber sections, such as fibrous glass sections. Each of the sections has a machine direction, a cross direction and a loft direction. The sections are positioned in an abutting relationship with the cross direction or the machine direction of the sections defining the thickness of the insulation assembly. An exterior cover encloses the plurality of abutting sections. The reorientation of the sections places the forces generated by the fibers in a desired relationship for installation in a building.

31 Claims, 3 Drawing Sheets

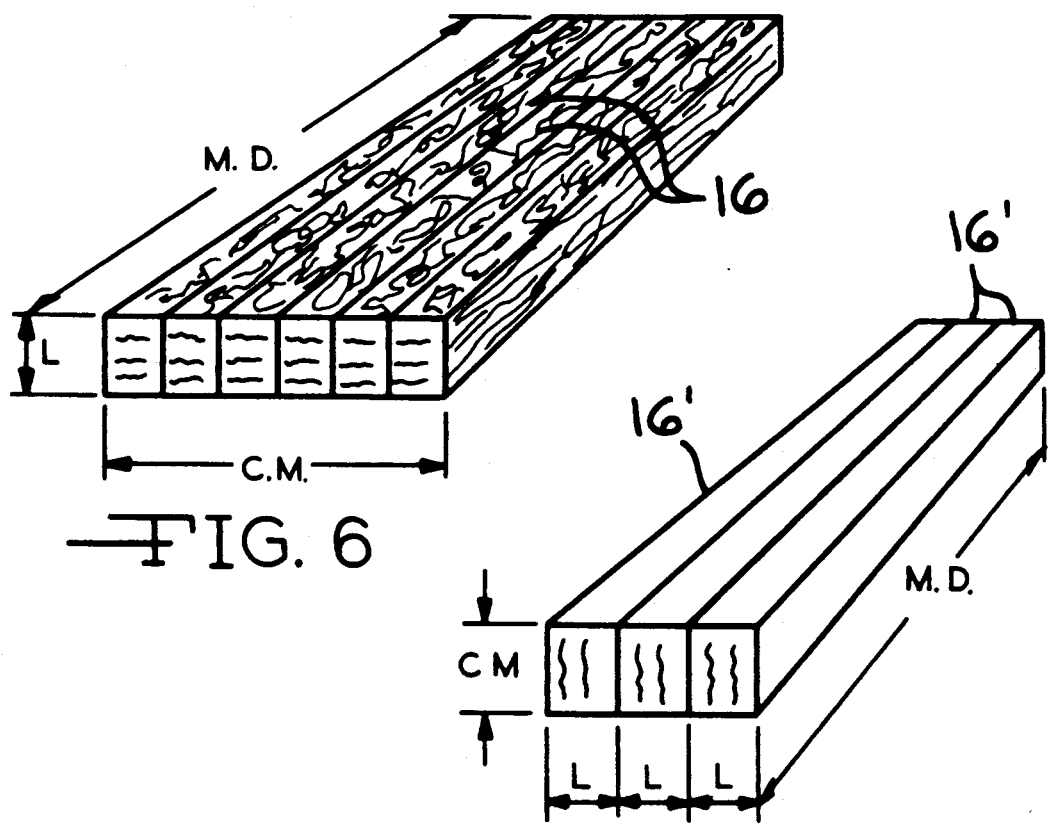
FIG. 6
FIG. 7
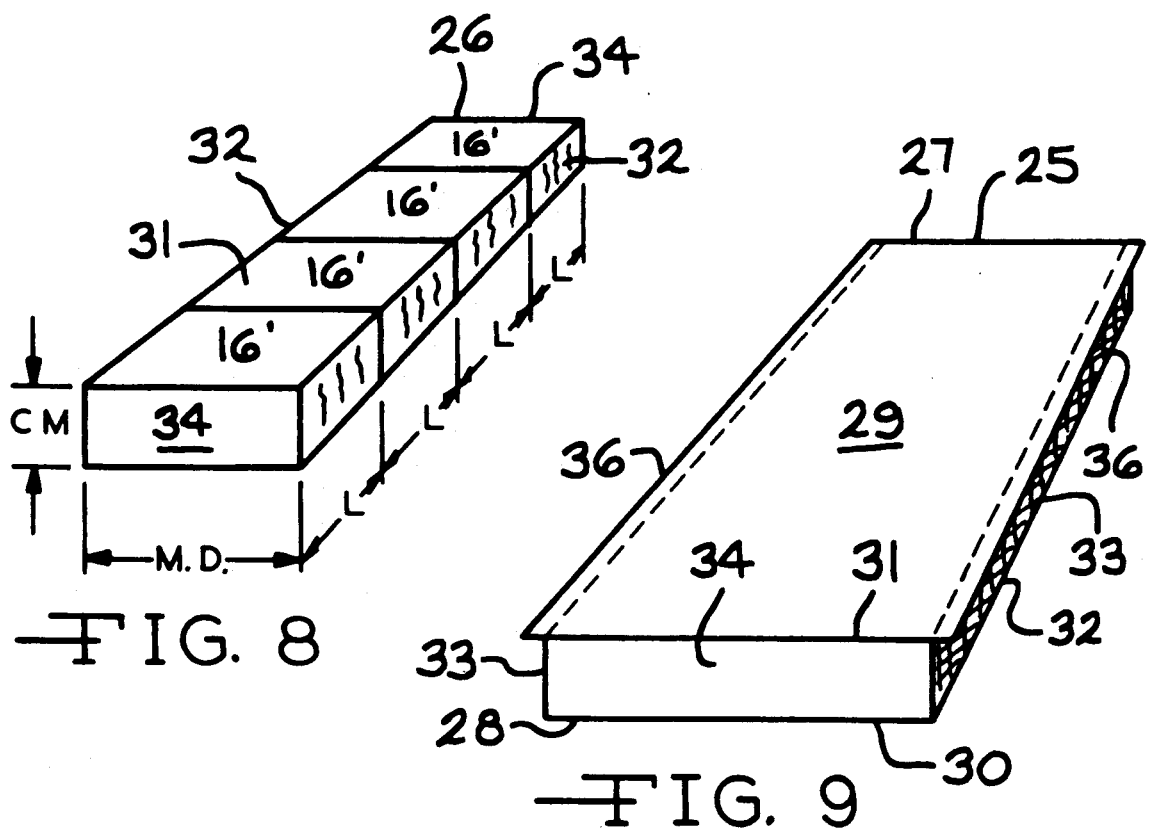
FIG. 8
FIG. 9

REORIENTED INSULATION ASSEMBLY AND METHOD

BACKGROUND OF THE INVENTION

This application is a continuation in part of Ser. No. 447,764, filed Dec. 8, 1989, abandoned.

The present invention relates to a reoriented insulation assembly which is used to insulate buildings including insulating floors, ceilings and walls of such buildings.

It is well known in the art to insulate buildings using various types of insulating materials including mineral fibers such as fibrous glass wool. Typically, prior art fibrous glass insulation incorporates a binder such as a phenolic based binder, applied to the glass wool subsequent to the fiberizing process. The purpose of the binder was to give the insulation assembly structural integrity. The resultant insulation assembly had sufficient strength to support itself in long strips so that it could be, for example, placed between adjacent wall studs or floor joists in a commercial or residential building. Prior art insulation assemblies typically use 4–8 percent binder, by weight, for light density insulation products, such as building insulation. Also, in prior art insulation assemblies the thickness of the insulation is process dependent and in the loft direction.

SUMMARY OF THE INVENTION

The present invention relates to a reoriented insulation assembly which provides an improved building insulation assembly which can be rapidly and effectively installed between, for example, wall studs, ceiling trusses, or floor joists of the building.

The present insulation assembly is formed from mineral fibers such as rock wool or fibrous glass wool. Each insulation assembly includes a plurality of mineral fiber sections, such as fibrous glass sections. Preferably, each section is constructed of a low density fibrous glass wool. Each of the sections has a machine direction, a cross direction and a loft direction. The machine direction is essentially the direction in which the fibrous glass wool sections are formed in the fiber forming apparatus as it is placed on the forming conveyor. The loft direction is the depth of the material as it lies on the conveyor, while the cross direction or cross machine direction is that direction which is perpendicular to the machine direction in the plane of the conveyor. Initially, as the fibrous wool travels along the forming conveyor, the loft direction is vertical and the cross direction is horizontal.

In the present reoriented insulation assembly, the sections are positioned in an abutting relationship with the cross machine or the machine direction of the individual sections defining the thickness of the overall reoriented insulation assembly. The finished product thickness will normally be in the range of 0.4 to 1.0 times the initial cut dimension. An exterior cover surrounds the plurality of the abutting sections to form the completed reoriented insulation assembly.

In one preferred embodiment, the sections are positioned in the insulation assembly such that the machine direction of each section defines the width of the insulation assembly and the loft direction of the abutting sections defines the length of the insulation assembly.

The reorientation of the sections orients the final product such that the expansion of the product, which is most prominent in the original loft direction, is controlled. For example, the reoriented insulation assembly can apply forces against spaced studs to hold the reoriented insulation assembly in a correct position in a sidewall system. Secondly, the fiber expansion, which is in the original loft direction, does not urge the main faces of the final package outwardly in a protruding fashion.

It is a primary object of the present invention to provide an improved reoriented insulation assembly for use as ready to install building insulation and a method of making the same.

It is a further object of the present invention to provide a reoriented mineral fiber insulation assembly which uses the expansion forces of the fibrous sections to hold the assembly into a desired position and also to present a relatively smooth appearance on its main outer faces.

DESCRIPTION OF THE DRAWINGS

FIG. 6 shows a plurality of sections which have been longitudinally cut.

FIG. 7 is a perspective view of the FIG. 6 fibrous glass sections after being given a first reorientation.

FIG. 8 is a perspective view of the fibrous glass sections shown in FIG. 7 after having been cut and been given another reorientation.

FIG. 9 is a preferred embodiment of a completed reoriented insulation assembly according to the present invention.

DESCRIPTION OF THE PREFERRED EMBODIMENTS

Figure 1:
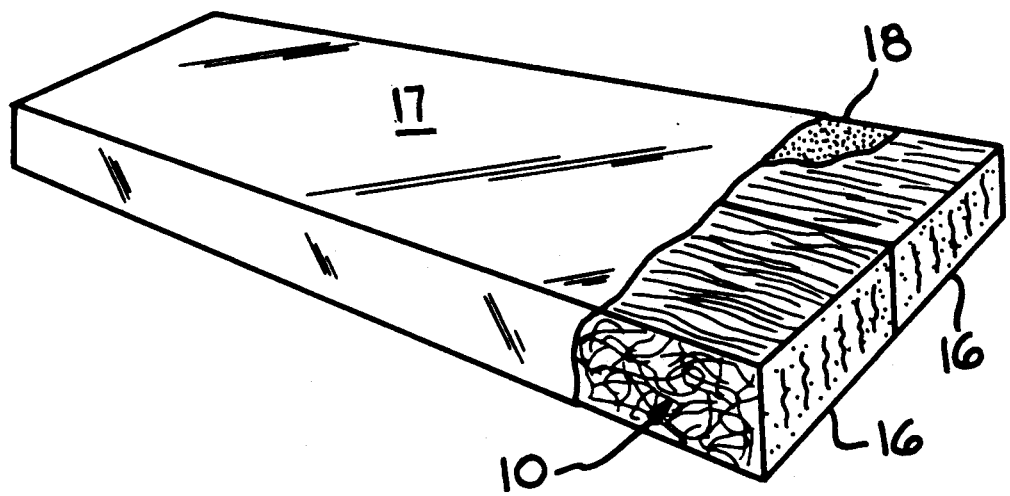
FIG. 1 is a perspective view, with a part of the outer layer broken away, showing one embodiment of a reoriented insulation assembly, according to the present invention.
Figure 2:
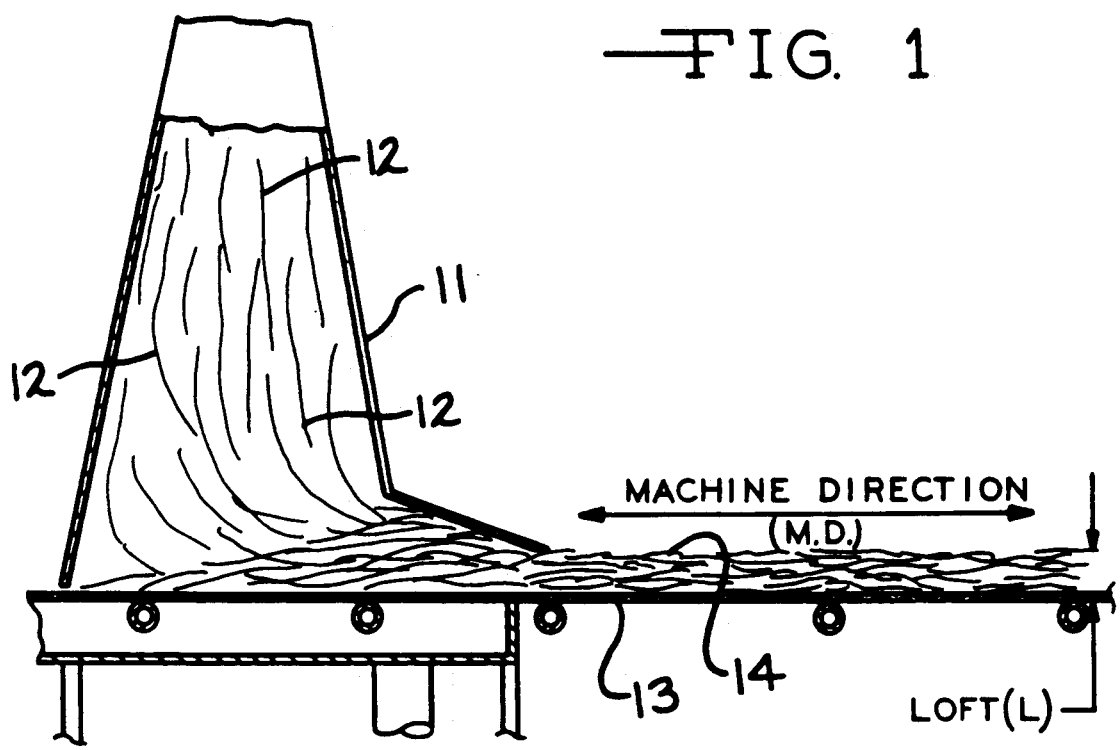
FIG. 2 is a fragmentary vertical cross-sectional view showing mineral fibers, such as fibrous glass fibers being deposited through a forming hood onto a conveyor and illustrating the machine direction and also the loft direction of the fibrous glass pack as it is being formed.

Referring to FIG. 1, a reoriented insulation assembly according to the present invention is generally indicated by the reference number 10. Referring to FIG. 2, a forming hood 11 is shown. Mineral fibers, such as rock wool and fibrous glass can be utilized. For example, in FIG. 2, glass fibers 12 are being deposited on a moving conveyor 13 to form a fibrous glass pack 14.

For the purposes of this specification and claims, the thickness of the originally formed fibrous glass pack 14 is termed the loft direction (L) while the longitudinal direction of the conveyor is termed the machine direction (MD). The width of the fibrous glass pack 14 is termed the cross direction or cross machine direction (CM). The glass fibers preferably have a mean length weighted fiber diameter less than 0.00034 inch (8.64E-6 meters). More specifically, the glass fibers 12 preferably have a mean length weighted fiber diameter between 0.00010 inch (2.54E-6 meters) and 0.00024 inch (6.10E-6 meters).

In the preferred embodiments, shown in FIGS. 7, 8 and 9, the fibrous glass wool is binderless. As used in the present specification and claims, the term "binderless" means the absence of binder materials or the presence of only small amounts of such binder materials, amounting to no more than one percent (1%) by weight. The addition of suppressants, e.g. oils, for dust control or other purposes is not considered a binder.

As the fibrous glass pack 14 moves along the conveyor, it is sliced in the machine direction to form a plurality of fibrous glass sections 16.

Figure 3:
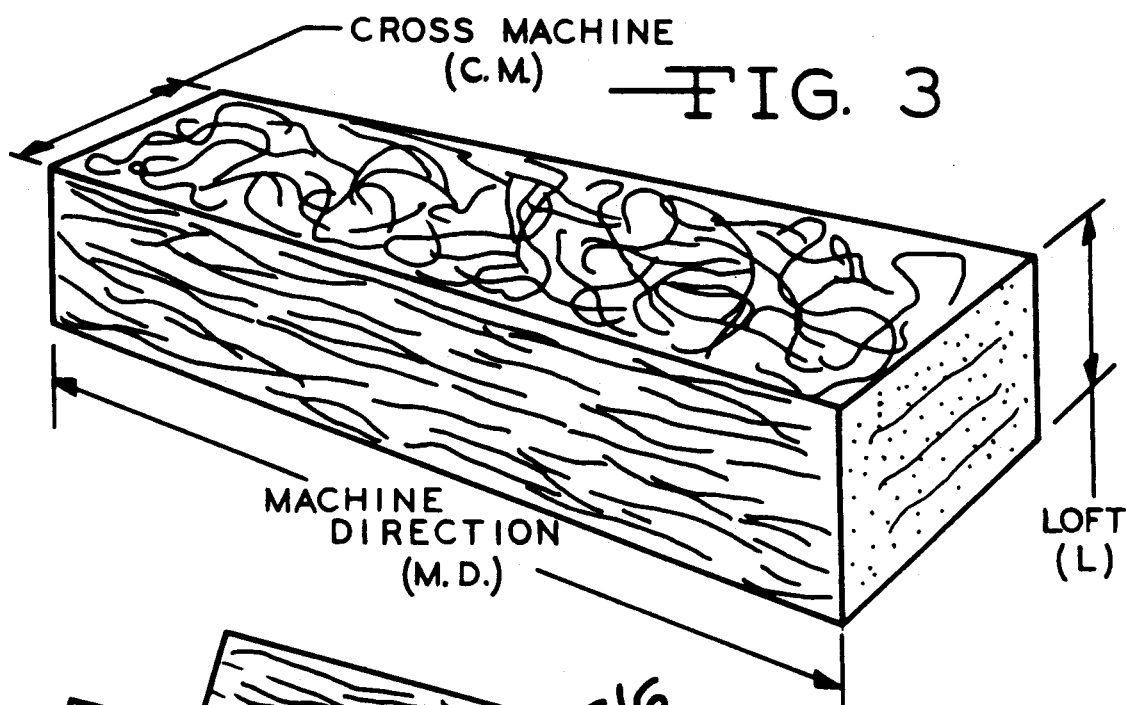
FIG. 3 is a perspective view of a fibrous glass pack after it has been formed on the conveyor, shown in FIG. 2, and illustrating the cross machine direction, the machine direction and the loft direction.

As used in the present specification and claims, the term "section" refers to, for example, the mineral fiber or fibrous glass unit 16 shown in FIG. 3 which, when held by one end, is self-supporting and does not disintegrate or fall apart as would be true of, for example, individual units of fibrous glass loose fill material.

Under the present method of making an insulation assembly, mineral fibers such as fibrous glass fibers are deposited on the conveyor 13. The units or sections 16 are formed by slitting the pack 14 transversely as it moves along the conveyor. The pack 14, in some embodiments, is also slit longitudinally to form a section of the desired dimensions.

In FIG. 3, the section 16 is shown after it has been removed from the conveyor 13. Also in FIG. 3, the length of the section 16 lies in the machine direction (MD), the width of the section 16 lies in the cross machine direction (CM) and the depth or thickness of the section 16 is in the loft (L) direction. In prior art units, the majority of the compression and expansion of the batt 16 occurs in the original loft direction. For example, if the section 16 is compressed in the loft direction for shipping, the entanglement of the fibers 12 stores sufficient energy to provide recovery ratios in excess of 6 to 1. The recovery ratio is the installed thickness of the final uncompressed assembly after the package is opened compared to the thickness of the compressed package in its shipping mode. The installed thickness is commonly referred to as the label thickness.

In the preferred embodiments shown in FIGS. 7 and 8, the cross direction will normally be cut 1.0 to 3.0 times the finished product thickness. Preferably in the range of 1.5 to 2.5 times finish thickness for the low "R" values per inch, and in the range of 1.0 to 2.0 for the high "R" values per inch.

The density of the fibrous glass sections 16 in the final product form is normally less than 2.0 pounds per cubic foot (32.03 kg/m$^3$). For assemblies having higher "R" values or higher thermal resistance values per inch, the preferred density of the fibrous glass sections 16 is between 1.0 pounds per cubic foot (16.01 kg/m$^3$) and 1.8 pounds per cubic foot (28.83 kg/m$^3$).

For assemblies having lower "R" values or lower thermal resistance values per inch, the preferred density of the fibrous glass sections 16 is between 0.3 pounds per cubic foot (4.81 kg/m$^3$) and 1.0 pounds per cubic foot (16.01 kg/m$^3$).

Figure 4:
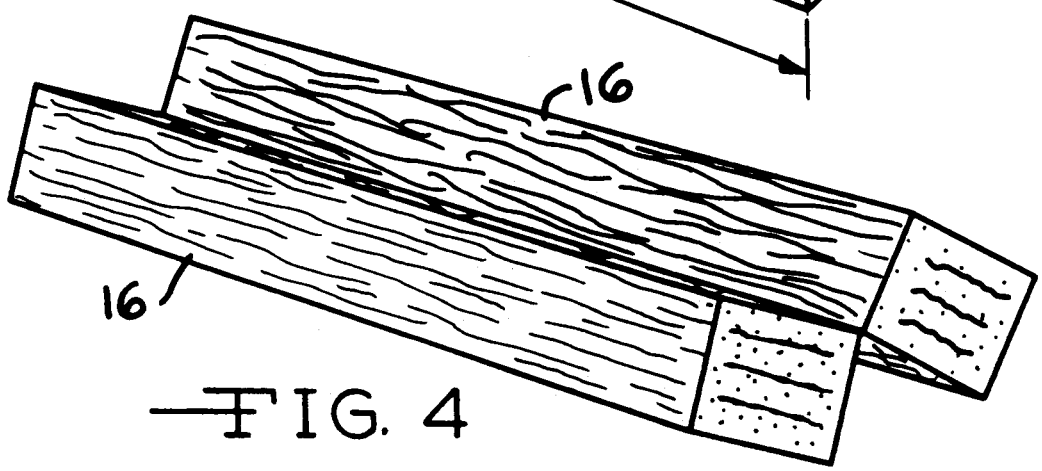
FIG. 4 is a perspective view showing two fibrous glass sections being reoriented.
Figure 5:
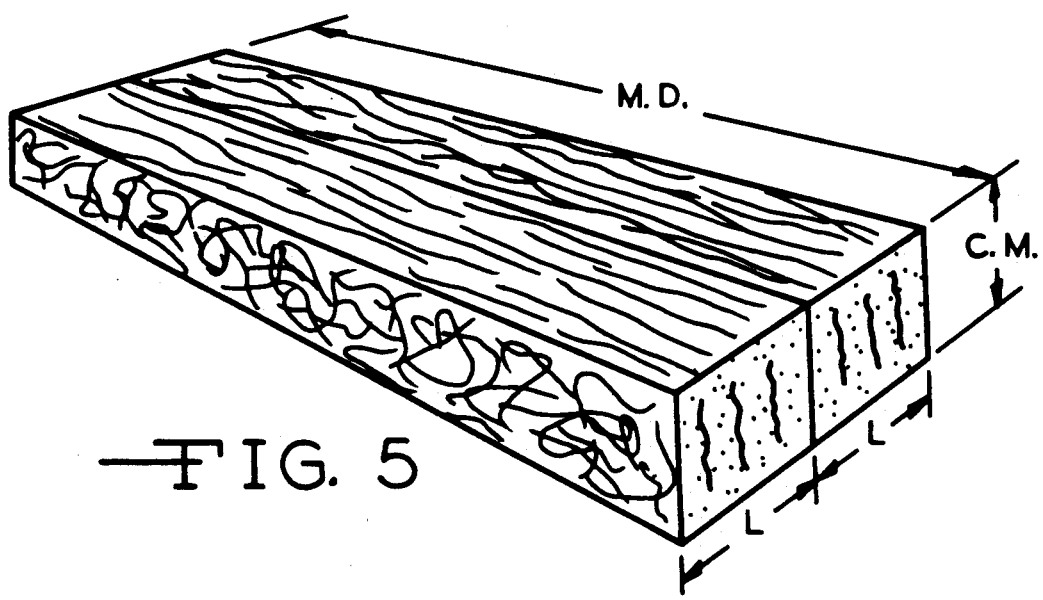
FIG. 5 is a perspective view of the FIG. 4 sections shown in their reoriented positions.

In the reoriented insulation assembly 10, according to the present invention, the sections 16 are reoriented by rotating the sections as shown in FIG. 4 to the position shown in FIG. 5. In this position, the two fibrous glass sections 16 are placed in a side-to-side relationship. If desired, the sections 16 can be adhered together with an adhesive or by some other fastening means. Reorientation has now placed the thickness or depth of reoriented sections 16 in the cross machine direction and the width of the reoriented sections 16 in the loft direction.

Referring to FIG. 1, the sections 16 are covered with an exterior layer 17. In the present embodiment, the exterior layer 17 comprises a polyethylene layer having a thickness of 0.4 mils. The polyethylene layer 17 preferably has a thickness of less than 1.0 mil and preferably has a thickness between 0.2 mil and 0.6 mil. The layer 17 may also be constructed from other materials, for example, polybutylene, metalized films, Kraft paper and non-woven materials. The layer 17 can consist of one material or comprise a combination of materials. Preferably, the exterior layer is comprised of any one or more of the following plastic films: polyethylene, other polyoelfins such as polypropylene or polybutylene, polyethylene terthalate (PET), polyamides, such as nylon 6,6, polystyrene, polyvinyl chloride, polyvinylidene chloride. Also, the exterior layer can be a woven or non-woven web produced from fibers of any of these polymers.

An adhesive 18 is preferably provided between the exterior layer 17 and the fibrous glass sections 16. The adhesive 18 may be provided on one or more surfaces of the sections 16. The adhesive 18 joins the fibrous glass sections 16 to the exterior layer 17 to retard vertical movement between the exterior layer 17 and the sections 16 when the reoriented insulation assembly 10 is, for example, vertically positioned between adjacent wall studs in a building.

Referring to FIG. 9, another preferred embodiment of a reoriented insulation assembly 25 is shown.

FIG. 7 shows three fibrous glass sections 16' which have been reoriented one time in the same manner as shown in FIG. 5 relative to the first reoriented insulation assembly 10. The fibrous glass sections 16' shown in FIG. 7 are then cut to their desired length in the machine direction (MD) and rotated to the position shown in FIG. 8. The shorter fibrous glass sections 16' (FIG. 8) abut one another and, if desired, may be adhered or otherwise fastened to one another. In the reoriented insulation assembly, 25 with the section alignment shown in FIG. 8, the width of the insulation assembly 25 is in the machine direction, the length of the insulation assembly 25 is in the loft direction and the depth or thickness of the insulation assembly 25 is in the cross machine direction.

The individual fibrous glass sections 16' form an overall batt unit 26 (FIG. 8) which is covered with an exterior layer 27. The exterior layer 27 has several components. A 0.4 mil High Density-High Molecular Weight (HDHMW) polyethylene layer 28 and 29 is positioned on the bottom 30 and top 31 of the batt unit 26. The edges 32 of the batt unit 26 are covered with a non-woven material layer 33. In the present FIG. 9 embodiment, the ends 34 of the batt units 26 are left open. However, in other embodiments (not shown) the ends 34 may be closed.

The open ends of the reoriented insulation assembly 25 serve as passageways for the introduction of atmospheric air at the job site. When the shipping bags (not shown) are removed, the influx of air allows the reoriented insulation assemblies 25 to expand to their desired size. In other embodiments, closed ends may be utilized and other air entry means provided in such as holes or slits.

The polyethylene layers 28 and 29 and the non-woven material layers 33 are adjoined at their abutting edges. In the present embodiment, the polyethylene layer 29 includes side flanges 36 which extend outwardly from the edges 32. Any number of side flanges 36 may be utilized. The side flanges 36 may be used, for example, to staple the insulation assemblies 25 to the adjoining studs in a building stud wall system.

It has been found that reoriented insulation assemblies, such as the insulation assemblies 10 and 25, place the forces generated by the entwined glass fibers 12 in desirable positions, not found in prior art assemblies. In addition to having the generated forces in the desired directions, the reoriented insulation assemblies 10 and 25 present pleasing outer surface appearances when installed.

We claim:

1. An insulation assembly, comprising, in combination, a plurality of fibrous glass sections, each of which said sections having a machine direction, a cross direction and a loft direction, said sections being reoriented into an abutting relationship with the cross direction or the machine direction defining the thickness of said insulation assembly, an exterior cover over said plurality of abutting sections, said exterior cover including side layers and polymeric top and bottom layers and air entry means for introducing air into said fibrous glass sections.

2. An insulation assembly, according to claim 1, wherein said fibrous glass sections consist of a plurality of glass fibers, having a means length weighted diameter less than 0.00034 inch (8.64E-6 meters).

3. An insulation assembly, according to claim 2, wherein, said exterior cover comprises a polyethylene layer.

4. An insulation assembly, according to claim 3, wherein said exterior cover includes a polyethylene layer positioned on the top and bottom of said assembly and a porous material having openings therethrough positioned on the side edges of said assembly, said openings comprising said air entry means.

5. An insulation assembly, according to claim 1, wherein each of said sections is constructed from binderless fibrous glass wool.

6. An insulation assembly, according to claim 5, including one or more openings in said cover to admit air, said openings comprising said air entry means.

7. An insulation assembly, according to claim 6, wherein said abutting sections are adhered to one another.

8. The insulation assembly according to claim 7, wherein said polyethylene layer comprises a polyethylene film.

9. An insulation assembly comprising, in combination, a plurality of fibrous glass sections, each of said sections having a machine direction, a cross direction and a loft direction, said sections positioned in an abutting relationship with the cross direction or the machine direction of said sections defining the thickness of said insulation assembly and an exterior cover over said plurality of abutting sections, said exterior cover including a polymeric layer positioned on the top and bottom of said assembly and a porous material having openings therethrough positioned on the side edges of said assembly, said openings comprising air entry means.

10. An insulation assembly, according to claim 9, including side flanges extending outwardly from said side edges.

11. An insulation assembly, according to claim 9, wherein said polymeric layer has a thickness of between 0.2 mil and 0.6 mil.

12. The insulation assembly, according to claim 11, wherein said polymeric layer comprises a polyethylene layer.

13. An insulation assembly, according to claim 9, wherein said fibrous glass sections consist of a plurality of glass fibers, having a means length weighted diameter between 0.00010 inch (2.54E-6 meters) and 0.00024 inch (6.10E-6 meters).

14. An insulation assembly, according to claim 9, wherein said sections are positioned such that the machine direction of each section defines the width of said insulation assembly and the loft direction of the abutting sections defines the length of said sections.

15. An insulation assembly, according to claim 9, wherein said sections are positioned such that the cross direction of each section defines the thickness of the section and the loft direction defines the width of each section.

16. An insulation assembly, according to claim 9, wherein said fibrous glass sections consist of a plurality of glass fibers, having a mean length weighted diameter less than 0.00034 inch (8.64E-6 meters).

17. The insulation assembly, according to claim 9, wherein said polymeric layer comprises a polyethylene layer.

18. The insulation assembly, according to claim 17, wherein said polyethylene layer comprises a polyethylene film.

19. An insulation assembly, comprising, in combination, a plurality of mineral fiber sections, each of said sections having a machine direction, a cross direction and a loft direction, said sections positioned into an abutting relationship with the cross direction or the machine direction of said sections defining the thickness of said insulation assembly and an exterior cover including a polymeric layer positioned on the top and bottom of said assembly and a porous material having openings therethrough positioned on the side edges of said assembly.

20. The insulation assembly, according to claim 19, wherein said polymeric layer comprises a polyethylene layer.

21. The insulation assembly, according to claim 20, wherein said polyethylene layer comprises a polyethylene film.

22. An insulation assembly according to claim 19, wherein said abutting sections are adhered to one another.

23. An insulation assembly, comprising, in combination, a plurality of fibrous glass sections, each of which said sections having a machine direction, a cross direction and a loft direction, said sections being reoriented into an abutting relationship with the cross direction or the machine direction defining the thickness of said insulation assembly and an exterior cover over said plurality of abutting sections, said fibrous glass sections consisting of a plurality of glass fibers, having a means length weighted diameter less than 0.00034 inch (8.64E-6 meters), said exterior cover including side layers and polymeric top and bottom layers, wherein said exterior cover includes a polyethylene layer positioned on the top and bottom of said assembly and a layer of porous material having openings therethrough positioned on the side edges of said assembly.

24. An insulation assembly, according to claim 23, wherein each of said sections is constructed from binderless fibrous glass wool.

25. An insulation assembly, according to claim 23, wherein said side layers comprise polymeric layers.

26. An insulation assembly, according to claim 25, including one or more openings in said cover to admit air.

27. An insulation assembly, according to claim 23, wherein said abutting sections are adhered to one another.

28. An insulation assembly, according to claim 23, wherein said polyethylene layers comprise polyethylene film.

29. An insulation assembly comprising, in combination, a plurality of fibrous glass sections, each of which said sections having a machine direction, a cross direction and a loft direction, said sections being reoriented into an abutting relationship with the cross direction or the machine direction defining the thickness of said insulation assembly, an exterior cover over said plurality of abutting sections, said exterior cover including side layers and polymeric top and bottom layers, including one or more openings in said cover to admit air.

30. An insulation assembly, according to claim 29, wherein said abutting sections are adhered to one another.

31. The insulation assembly according to claim 30, wherein said polyethylene layer comprises a polyethylene film.

* * * * *